United States Patent
Vitic et al.

(10) Patent No.: US 11,391,627 B1
(45) Date of Patent: Jul. 19, 2022

(54) MANAGING STRAY LIGHT IN INTEGRATED PHOTONICS DEVICES

(71) Applicant: Ciena Corporation, Hanover, MD (US)

(72) Inventors: Michael Vitic, Chelsea (CA); Sean Sebastian O'Keefe, Dunrobin (CA); Christine Latrasse, Quebec (CA)

(73) Assignee: Ciena Corporation, Hanover, MD (US)

( * ) Notice: Subject to any disclaimer, the term of this patent is extended or adjusted under 35 U.S.C. 154(b) by 177 days.

(21) Appl. No.: 16/835,902

(22) Filed: Mar. 31, 2020

(51) Int. Cl.
*G01J 1/44* (2006.01)
*G02B 6/12* (2006.01)
*G02B 6/13* (2006.01)

(52) U.S. Cl.
CPC .......... *G01J 1/44* (2013.01); *G02B 6/12004* (2013.01); *G02B 6/13* (2013.01); *G01J 2001/444* (2013.01); *G01J 2001/446* (2013.01); *G02B 2006/12123* (2013.01)

(58) Field of Classification Search
CPC .. G01J 1/44; G01J 2001/444; G01J 2001/446; G02B 2006/12123; G02B 6/13; G02B 6/12004
See application file for complete search history.

(56) References Cited

U.S. PATENT DOCUMENTS

| 5,233,444 | A | * | 8/1993 | Musha | G02B 7/32 250/201.5 |
| 2017/0131142 | A1 | * | 5/2017 | Luk | G01J 1/4228 |
| 2021/0167230 | A1 | | 6/2021 | Pelletier et al. | |

* cited by examiner

*Primary Examiner* — Georgia Y Epps
*Assistant Examiner* — Don J Williams
(74) *Attorney, Agent, or Firm* — Young Basile Hanlon & MacFarlane, P.C.

(57) ABSTRACT

A first photodiode is integrated within at least a first layer of one or more semiconductor layers, the first photodiode comprising an active area optically coupled to a guided mode of a first waveguide to couple the first photodiode to an optical distribution network. One or more associated photodiodes are associated with the first photodiode integrated within at least the first layer in proximity to the first photodiode. An active area of a single associated photodiode or a sum of active areas of multiple associated photodiodes is substantially equal to the active area of the first photodiode. None of the associated photodiodes is coupled to the optical distribution network. Electrical circuitry is configured to generate a signal that represents a difference between (1) a signal derived from the first photodiode and (2) a signal derived from a single associated photodiode or a sum of signals derived from multiple associated photodiodes.

20 Claims, 9 Drawing Sheets

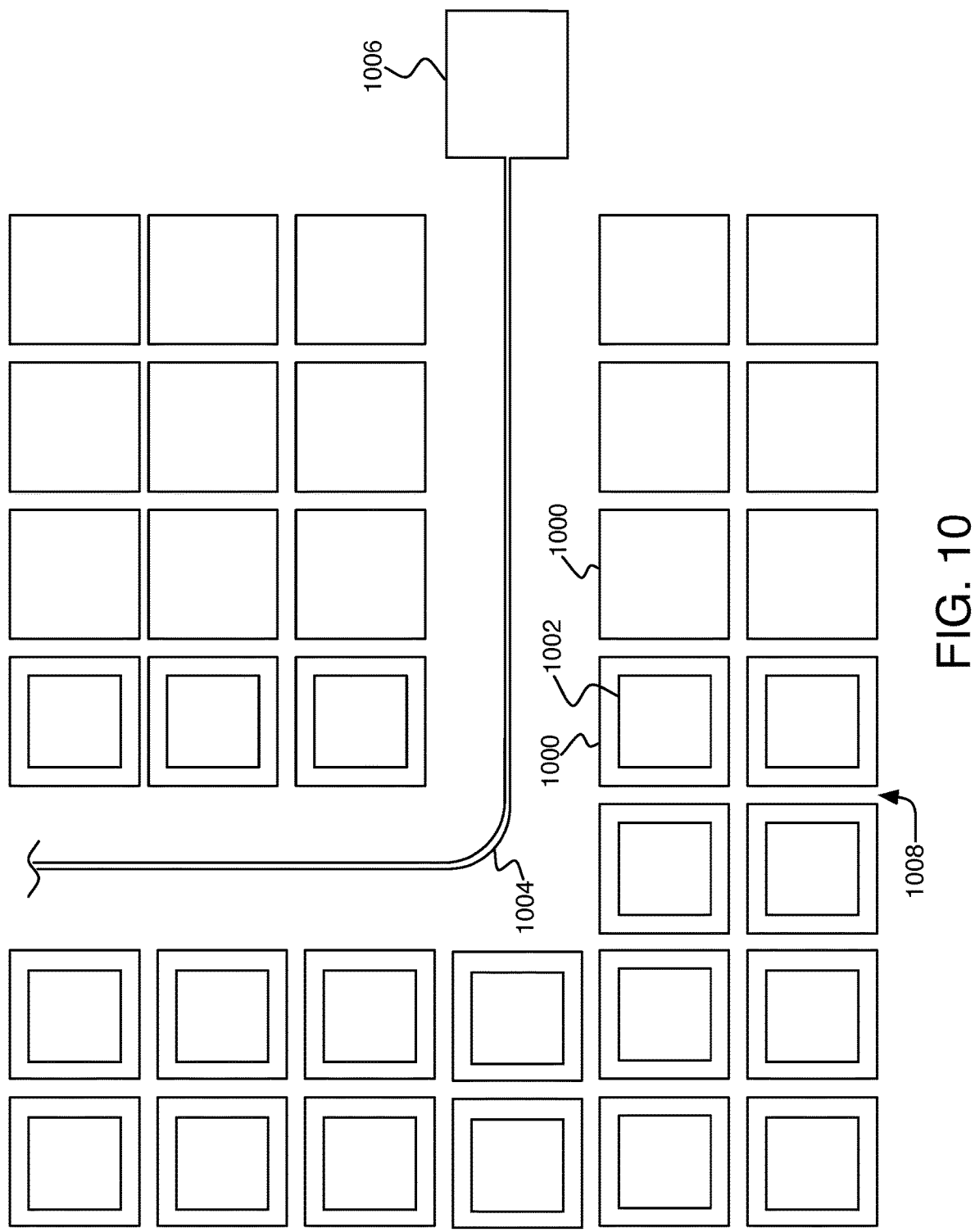

MANAGING STRAY LIGHT IN INTEGRATED PHOTONICS DEVICES

TECHNICAL FIELD

This disclosure relates to managing stray light in integrated photonics devices.

BACKGROUND

Photonic integrated circuits (PICs) often include optical waveguides for transporting optical waves around a device and into and out of various photonic structures (e.g., splitters, modulators, interferometers, resonators, multimode interference (MMI) couplers, photodetectors, etc.). A waveguide is a structure that confines and guides the propagation of an electromagnetic wave. Some electromagnetic waves have a spectrum that has a peak wavelength that falls in a particular range of optical wavelengths (e.g., between about 100 nm to about 1 mm, or some subrange thereof), also referred to as "optical waves," "light waves," or simply "light," and waveguides for light will be referred to herein as "optical waveguides". These optical waveguides may be implemented, for example, by forming a core structure from a material having a higher refractive index (e.g., silicon, or silicon nitride) surrounded by a cladding (also called a "buffer") comprising one or more materials (or air) that have a lower refractive index. For example, the core structure may be formed by the silicon layer over a buried oxide (BOX) layer (e.g., silicon dioxide) of a substrate, such as a silicon-on-insulator (SOI) wafer, while the cladding would be formed by the oxide of the BOX layer and the silicon dioxide deposited on top of the core structure. The cladding may in some cases be formed by a single lower-index material (or air), or by multiple different lower-index materials (or air). This cladding material may be deposited during the fabrication of the PIC, or added later during module fabrication and may serve other purposes such as an epoxy/adhesive, an inter-die filler material in a stacked-die application, an encapsulant, or an index matching gel/fluid. Air can act as cladding, for example, if a core material is deposited on top of a cladding material without another material being deposited on top of the core material, or if a core material is suspended above a substrate. In some cases, light in a PIC may not be perfectly contained within waveguides or other optical structures and may leak into the substrate, and such stray light may limit the dynamic range of detectors.

SUMMARY

In one aspect, in general, an apparatus comprises: one or more semiconductor layers; an optical distribution network including at least a first waveguide integrated within at least one of the one or more semiconductor layers; a first photodiode integrated within at least a first layer of the one or more semiconductor layers, the first photodiode comprising an active area optically coupled to a guided mode of the first waveguide to couple the first photodiode to the optical distribution network, and contacts that provide access to the photocurrent from light absorbed in the active area; one or more associated photodiodes associated with the first photodiode integrated within at least the first layer in proximity to the first photodiode, where an active area of a single associated photodiode or a sum of active areas of a plurality of associated photodiodes is substantially equal to the active area of the first photodiode, and none of the one or more associated photodiodes is coupled to the optical distribution network; and electrical circuitry configured to generate a signal that represents a difference between (1) a signal derived from the first photodiode and (2) a signal derived from a single associated photodiode or a sum of signals derived from a plurality of associated photodiodes.

In another aspect, in general, a method for fabricating a photonic device comprises: fabricating one or more semiconductor layers; fabricating an optical distribution network including at least a first waveguide integrated within at least one of the one or more semiconductor layers; fabricating a first photodiode integrated within at least a first layer of the one or more semiconductor layers, the first photodiode comprising an active area optically coupled to a guided mode of the first waveguide to couple the first photodiode to the optical distribution network, and contacts that provide a photocurrent from light absorbed in the active area; fabricating one or more associated photodiodes associated with the first photodiode integrated within at least the first layer in proximity to the first photodiode, where an active area of a single associated photodiode or a sum of active areas of a plurality of associated photodiodes is substantially equal to the active area of the first photodiode, and none of the one or more associated photodiodes is coupled to the optical distribution network; and fabricating electrical circuitry configured to generate a signal that represents a difference between (1) a signal derived from the first photodiode and (2) a signal derived from a single associated photodiode or a sum of signals derived from a plurality of associated photodiodes.

Aspects can include one or more of the following features.

The associated photodiodes associated with the first photodiode each have at least a portion of an active area that is within a maximum distance from at least a portion of the active area of the first photodiode, and the maximum distance is less than 10 times a maximum diameter of the active area of the first photodiode (e.g., for an active area having a given shape, the maximum diameter is the length of the largest line segment with endpoints on the perimeter of that shape).

The maximum distance is less than the square root of the active area of the first photodiode.

The maximum distance is less than 10 microns.

The electrical circuitry comprises circuitry that is connected to a metal contact within an integrated circuit that includes the one or more semiconductor layers.

The electrical circuitry comprises a node between a first wire connected to a cathode of the first photodiode, a second wire connected to an anode of at least one of the one or more associated photodiodes, and a third wire.

The electrical circuitry comprises an operational amplifier configured as a transimpedance amplifier with the third wire connected to an inverting input of the operational amplifier.

The electrical circuitry comprises a first transimpedance amplifier including the first photodiode, a second transimpedance amplifier including at least one of the one or more associated photodiodes, and circuitry configured to provide an output that is proportional to a difference between (1) an output voltage of the first transimpedance amplifier and (2) a quantity that depends on an output voltage of the second transimpedance amplifier.

The one or more associated photodiodes comprise a plurality of associated photodiodes.

The plurality of associated photodiodes are substantially the same distance from the first photodiode.

The plurality of associated photodiodes are located at positions that are arranged substantially symmetrically around the first photodiode.

Aspects can have one or more of the following advantages.

The techniques described herein provide mechanisms for mitigating the effects of stray light. For example, some of the techniques described herein can be used to measure and subtract the background noise caused by stray light that would otherwise limit the capability of photodetectors to achieve a large dynamic range. In some systems that use photonic integration, the area of a photonic integrated circuit may have been considered too scarce of a resource to use for additional photodiodes (e.g., especially on semiconductor substrates other than Silicon, such as Indium Phosphide). But, in some systems it may be worthwhile to trade off a portion of the functional area of a photonic integrated circuit for additional devices and supporting circuitry to improve signal dynamic range. In some cases, estimates and experiments have shown that the stray light-induced error in test signals at relatively low power levels (e.g., signal power below about −25 dBm for a signal with a dynamic range between about −40 dBm and +20 dBm) can be reduced significantly using the subtraction techniques described herein. Various factors can affect the extent of the error reduction that can be achieved, including wavelength, temperature, and/or source and power of the stray light guided in various portions of the PIC.

Other techniques that can be used, alone or in combination with the subtraction techniques described herein, enable the absorbing of some of the stray light in a PIC using material layers and fabrication steps that are compatible with those typically available in existing facilities that are used for semiconductor fabrication (e.g., complementary metal-oxide-semiconductor (CMOS) fabrication facilities, facilities making integrated circuits using both bipolar transistors and CMOS transistors in the same die (BiCMOS), etc.). By covering a significant portion of the area of a chip with light absorbing structures (e.g., tiled structures or uniform/fully dense structures), the amount of stray light left to spread to functional photonic structures on the chip can be effectively reduced, with minimal or no impact on cost. The effects of remaining stray light that has not been absorbed can be mitigated using the subtraction techniques presented here. In some fabrication facilities, there may be design rules imposed on the fabrication process that state that open/unused areas of a mask need to be filled with tiled structures in order to maintain a certain percentage fill of the mask area. In some cases, such "tiling" (also called "filler patterns") may be used for mechanical purposes, such as reducing stress, increasing uniformity of structure density, or improving uniformity of etching results. Taking advantage of these structures for an additional purpose of absorbing stray light can improve optical performance of the devices on the chip with minimal negative impact on yield. Some examples of the functional blocks on a PIC chip that could benefit from such a reduction in stray light include optical coherent receivers and coherent transmitters (which both include tap photodetectors), intensity-modulation/direct-detect (IM and DD) transmit and receive functional blocks that have light monitoring structures on-die, and any of the above or similar applications where the transmit and receive functions are integrated on a single die. All of the above benefit in some way from the extended dynamic range that would be achievable by reducing stray light. For example, in some implementations, the dynamic range could be increased up to 5-7 dB or more depending on tiling density and device configuration.

For both the stray light subtraction techniques and the stray light absorption techniques, which can be used separately or together in some implementations, there are also potential cost benefits that could be achieved by reducing the need for other, potentially more expensive, techniques for reducing or managing the effects of stray light, as described in more detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10 is a schematic diagram showing a portion of a photonic circuit showing an arrangement of light absorbing structures in the general vicinity of a waveguide and a photodetector.

DETAILED DESCRIPTION

Figure 1:
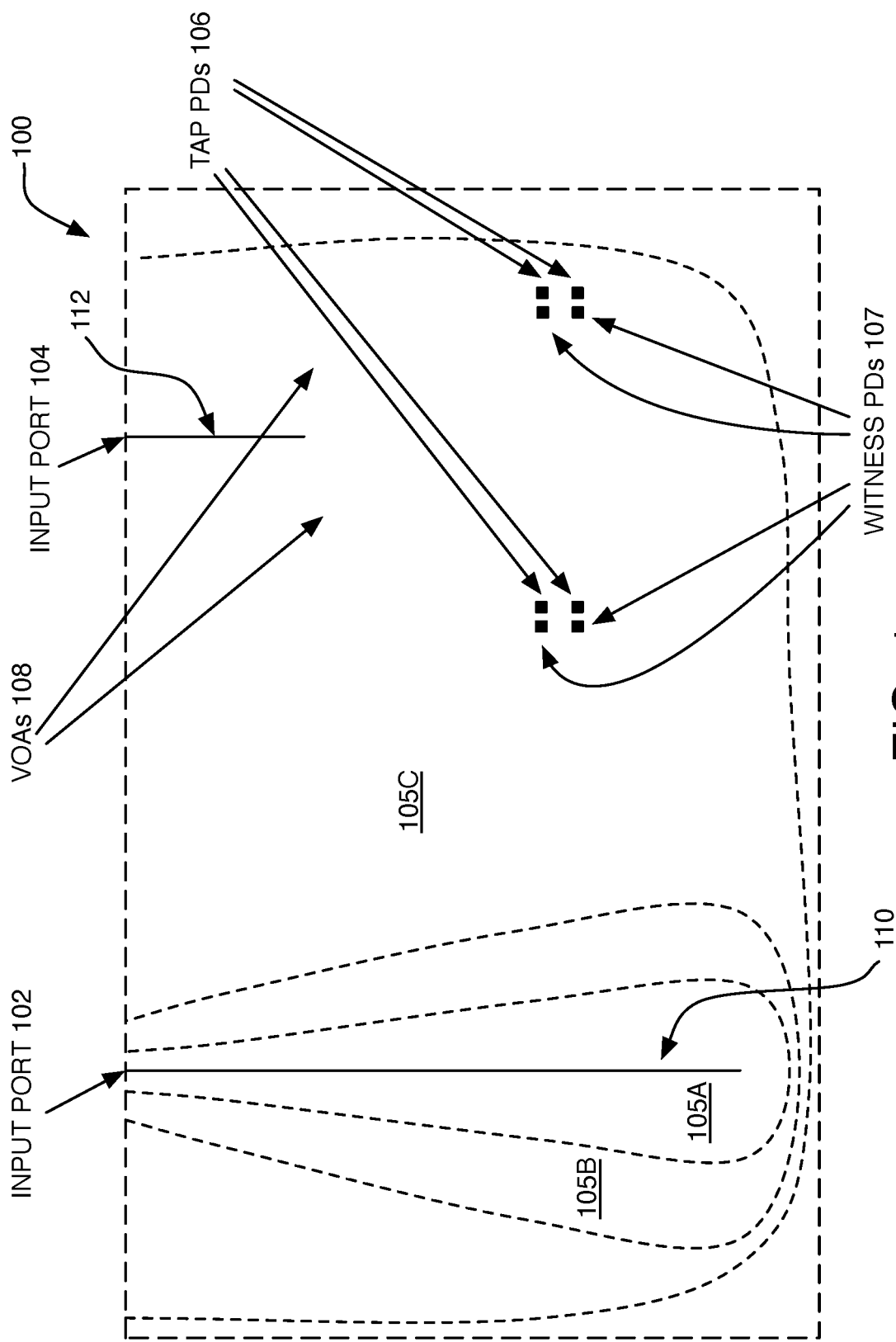
FIG. 1 is a schematic diagram of a portion of a photonic integrated circuit illustrating the spread of stray light associated with an optical wave being coupled into an input port, and placement of witness photodiodes used to mitigate effects of the stray light.

One of the reasons that it may be convenient to fabricate photonic integrated circuits using fabrication techniques used for electrical (e.g., CMOS or other circuit technologies as mentioned earlier) integrated circuits (ICs) is that optical signals carried by optical waves can be used in the same chip where electrical signals are carried by an electrical current or voltage. In some cases, a variety of photonic and electronic devices can be integrated into the same chip. One kind of device that is used both in chips that contain mostly PIC devices and chips that integrate PIC and IC devices is a photodetector (or a photoreceiver) that converts an optical signal into an electrical signal. An example of a platform that can be used for PIC and IC devices is a silicon photonics (SiP) platform. A SiP chip can be fabricated using a silicon wafer (e.g., a silicon-on-insulator (SOI) wafer) that is processed using various standard fabrication process steps and diced to yield individual SiP dice.

A photodetector can be formed from a photonic structure called a photodiode, which is able to convert the photons of a received optical wave into a photocurrent. This photocurrent can then be further processed by an electronic circuit to provide an output current or an output voltage (e.g., in a transimpedance amplifier). Such photodetector devices formed using photodiodes can be used, for example, to detect a variety of types of optical signals coming from various types of photonic devices (e.g., an optical modulator), which may be formed from specific photonic structures (e.g., a Mach-Zehnder interferometer, or a ring resonator). In order to monitor the activity of these photonic devices, a small amount of light can be coupled out of a waveguide using a directional coupler or a multi-mode interference splitter, for example, and sent to these monitoring photodetectors.

In some cases, it may be beneficial for a device receiving an optical signal to have a large dynamic range, such that both strong signals (carried on an optical wave with a relatively high optical power) and weak signals (carried on an optical wave with a relatively low optical power) are able to be detected. However, if the optical wave being detected has a low optical power, then it may be more vulnerable to stray light leaking into the detector, or into a waveguide coupled to the detector, from somewhere other than an intended source. One potential source of stray light may occur due to a mismatch between intensity profiles of different guided modes of different respective waveguides that are coupled to each other. For example, if there is imperfect alignment between an optical fiber and an input port of a PIC, some of the power in the mode of the optical fiber that is not perfectly matched to the mode of the input port can make its way into a substrate of the PIC, or the silicon dioxide cladding layers that surround the optical waveguides. Similarly, if different types of waveguides on a PIC are coupled without a sufficiently adiabatic transition between the different waveguides, there may be some stray light that is lost to surrounding structures. For example, if the PIC comprises a SiP die, light may leak into the silicon substrate, the BOX layer of the SOI substrate, or the silicon dioxide that has been deposited above a layer of photonic structures. Even if the light is received from an output mode of a laser or other light source integrated in the SiP (i.e., without requiring an explicit input port requiring alignment), stray light from the source may also leak out of the source and into the SiP die. Some structures in the SiP die, such as imperfectly terminated unused ports of couplers, may also scatter stray light. Another potential source of stray light is scattering from waveguide surfaces that are not sufficiently smooth (e.g., from rough sidewalls of a ridge waveguide or a rib waveguide). While light can also be scattered due to route changes in a waveguide (e.g., bends that have a radius that too small to maintain total internal reflection of light in a guided mode), the bends in a waveguide are typically designed to be large enough to avoid such losses. The stray light may also be sourced from outside the PIC itself (from a neighboring PIC, an different laser/light source, etc.), where the optical properties of the PIC can effectively 'capture' some of this externally sourced light and couple it into the cladding. Such stray light from any of these sources can then undesirably propagate to and illuminate some or all of the photodiodes in the PIC.

FIG. 1 shows a portion of a PIC in a SiP die 100 that includes structures that would be present in a typical integrated system, such as an optical front end of a coherent receiver, and illustrates an example of the effects of stray light. In this example, some optical structures and other fabricated structures (e.g., metal conducting paths) are not shown for clarity. But, this example does show an input port 102 for coupling the local oscillator (LO) light into an optical waveguide 110, and another input port 104 for coupling the receiver signal (SIG) light into another optical waveguide 112 (with only portions of the optical waveguides 110 and 112 being shown). The propagation of stray light over portions of the SiP die 100 are represented by different stray light regions 105A, 105B, and 105C in which stray light would have different respective ranges of intensity, with the region 105A having the highest intensity of stray light, and the regions 105B and 105C having lower intensities of stray light. While the actual amount of loss represented by the light that spreads into the stray light regions 105A, 105B, and 105C may be relatively small (e.g., 0.1%), even a small loss from a sufficiently intense optical wave can result in a significant amount of stray light. In this example, the wavelength of both the LO light and the SIG light is in the infrared (IR) portion of the electromagnetic spectrum, around 1550 nm, but in other examples the stray light could be in other portion(s) of the electromagnetic spectrum.

The stray light regions 105A, 105B, and 105C in this example are mostly a result of the relatively intense unguided LO light that is leaking into surrounding portions of the substrate and upper-cladding due mainly to misalignment at the input port 102. The brightest stray light region 105A would be near the initial path of the LO light, but the other stray light regions 105B and 105C could still receive significant amounts of the leakage LO light, which can cause problems for measurement of the SIG light. While the placement of these or other detectors would ideally be in relatively dark regions that are not as intensely illuminated by stray light as the stray light regions 105A-C, such selective placement may not always be possible, so it is useful to absorb as much of this stray light as possible within as many of the stray light regions as possible in order to make the whole SiP die 100 darker.

In this example, there are tap photodiodes (PDs) 106 that are used to detect the amount of SIG light received at the input port 104 that is delivered by an optical waveguide before and after sets of in-line variable optical attenuators (VOAs) 108. Such measurements can be used for a variety of applications (e.g., input- or output-referred optical power monitoring, Mach-Zehnder Modulator (MZM) quadrature locking circuits, etc.). These tap PDs 106 are in the stray light region 105C of the SiP die 100 that is being illuminated by a significant amount of the leaked LO light. This illumination by stray light may be undesirable since it can limit the dynamic range attainable by the tap PDs 106. For example, if the SIG light is relatively weak after attenuation and the LO is relatively strong, the leaked LO light that reaches a tap PD may be strong enough generate noise that degrades the SIG light measurement.

In order to limit the effects of stray light, witness photodiodes (PDs) 107 can be fabricated within the SiP die 100 in proximity to respective ones of the tap PDs 106. In this example, each tap PD (e.g., one for a first linear polarization, and one for a second orthogonal linear polarization, in a polarization diversity photonic configuration) is in proximity to a corresponding witness PD. An optical distribution network can deliver coupled light into the tap PDs via waveguides that are fabricated within one or more layers of the SiP die 100. However, the witness PDs are deliberately left uncoupled to the optical distribution network so that no guided light is coupled into the witness PDs. In this way, the signal from a witness PD in proximity to a particular main PD (such as the tap PDs) is able to provide an accurate measure of a background level of stray light that is incidentally absorbed in an active area of the main PD, as described in more detail below.

Figure 2:
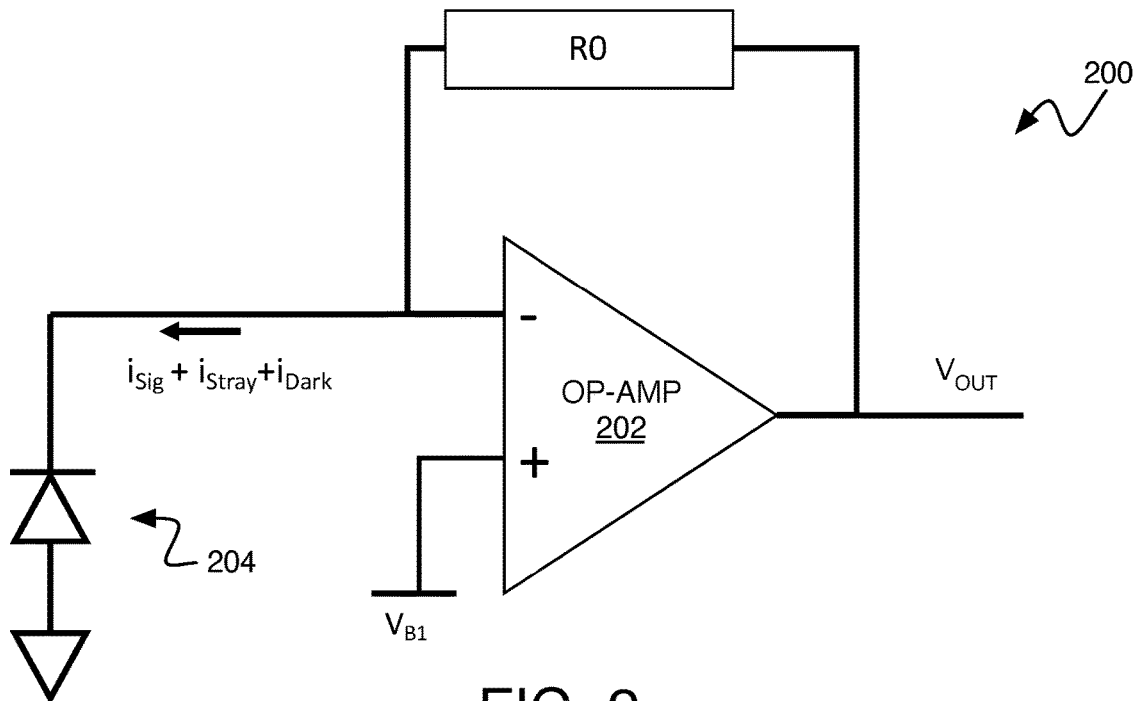
FIG. 2 is a circuit diagram of an example transimpedance amplifier.

Referring to FIG. 2, a transimpedance amplifier (TIA) 200 is shown, which would be used in a typical optical-to-electrical interface integrated within or connected to a PIC (e.g., via metal contact(s) in the PIC), for example. This example implementation includes an operational amplifier (Op-Amp) 202 connected to a photodiode 204, which has its cathode connected to the inverting input of the Op-Amp 202 and its anode grounded. The non-inverting input of the Op-Amp 202 is held at a bias voltage $V_{B1}$ to reverse bias the photodiode 204. The photodiode 204 generates a signal current due to absorption of light over its active area, where electrons and holes generated in a depletion region due to absorption of photons create a current from the anode and cathode contacts of the photodiode. The total current flowing into the anode of the photodiode 204 can be represented as the sum $i_{Sig}+i_{Stray}+i_{Dark}$, which generates a voltage across a feedback resistor, which has a resistance R0, expressed as the sum $V_{Sig}+V_{Stray}+V_{Dark}$, where the voltages are given by $V_{Sig}=i_{Sig}R0$, $V_{Sig}=i_{Sig}R0$, and $V_{Sig}=i_{Sig}R0$. The voltage $V_{Sig}$ represents a contribution to the output voltage due to the photocurrent $i_{Sig}$ generated in the photodiode 204 from absorption of "signal" light provided by a signal source (e.g., a waveguide). The voltage $V_{Dark}$ represents a contribution to the output voltage due to the dark current $i_{Dark}$ in the photodiode 204 (i.e., current due to the random generation of electrons and holes within the depletion region even without any photons being absorbed). The voltage $V_{Stray}$ represents the contribution to the output voltage due the photocurrent $i_{Stray}$ generated in the photodiode 204 from absorption of stray light absorbed over the active area coming from sources other than the signal source. The output voltage of the Op-Amp 202 is then given as $$V_{OUT}=V_{B1}+V_{Sig}+V_{Stray}+V_{Dark}$$

where the bias voltage $V_{B1}$ is a relatively precisely known voltage, the voltage $V_{Dark}$ due to dark current is less precisely known and is a strong function of temperature and $V_{B1}$, and the voltage $V_{Stray}$ due to stray light is generally unknown, or known only within a certain approximate range. In particular, the stray light and dark current contributions represent noise that will limit the ability of subsequent measurement or sampling circuitry to determine an accurate signal voltage $V_{Sig}$, especially for low magnitudes, thus limiting the dynamic range.

Figure 3:
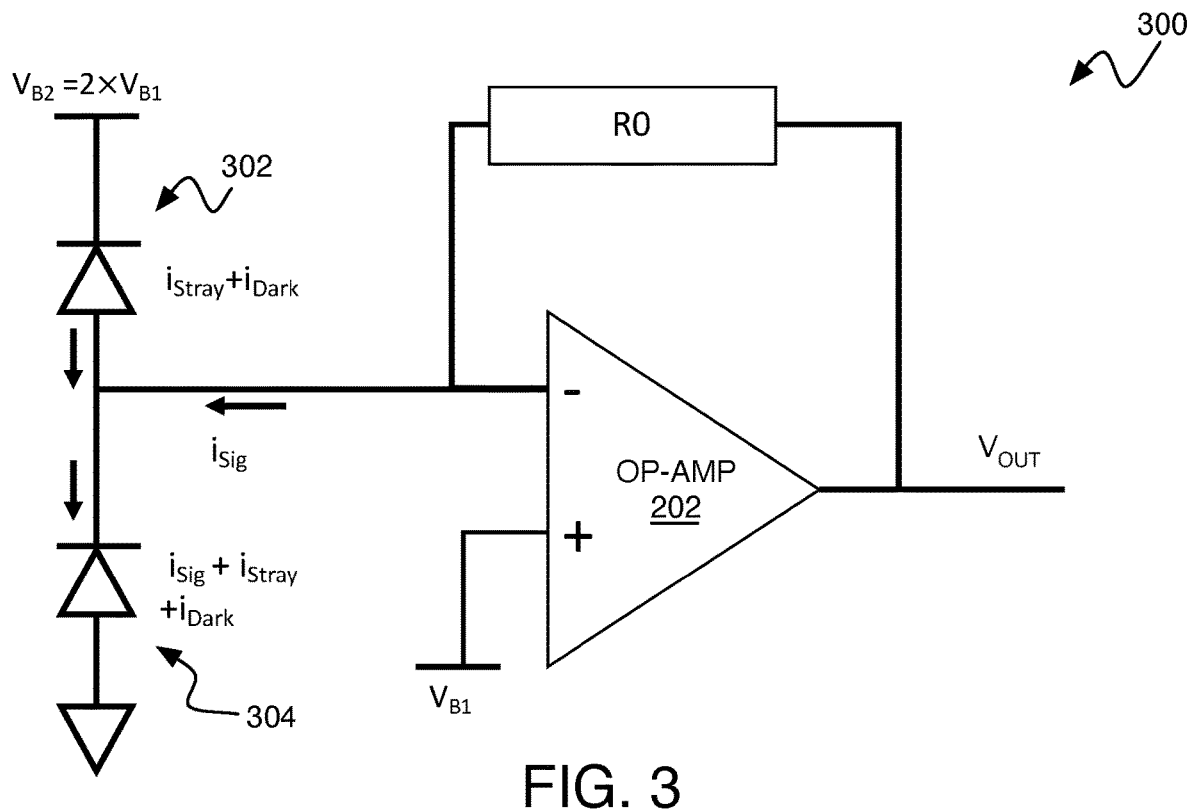
FIG. 3 is a circuit diagram of an example transimpedance amplifier.

Referring to FIG. 3, to mitigate the effects of the stray light and dark current, a transimpedance amplifier (TIA) circuit 300 includes a witness photodiode 302 in proximity to a main photodiode 304. As before, the main photodiode 304 is configured to receive signal light. For example, the signal light may be provided from a waveguide that emits light from a guided mode that is then optically coupled to an active area of the main photodiode 304. The waveguide may be connected, for example, to an optical distribution network in a device such as a PIC. In some implementations, the witness photodiode 302 and the main photodiode 304 are integrated within the same layer of a PIC device with one or more layers of semiconductors. By making the active area of the witness photodiode 302 substantially the same size as the active area of the main photodiode 304, both the magnitude of the dark current and the amount of stray light absorbed are likely to be substantially the same. But, because the witness photodiode 302 is not coupled to the optical distribution network, the signal current will not be generated in the witness photodiode 302. There is a basic principle in electrical engineering called Kirchoff's Current Law which states that the sum of currents into a node in a circuit equals the sum of currents out of that node. By attaching the anode of the witness photodetector 302, the cathode of the main photodiode 304, and the inverting input node of the Op-Amp 202, to generate a node as shown in FIG. 3, and observing the current flow direction arrows, it follows that the dark and stray components of the current in the photodiodes will cancel, and the current flowing towards the common node from the Op-Amp (i.e. through the feedback resistor) will be just the current due to the desired signal light in the main photodiode. Of course, if the dark and stray light components are not completely identical in the two photodiodes then they will not completely cancel, but the remaining signal will be significantly smaller than without this cancellation effect. The dark current of a photodiode ($i_{Dark}$) is a strong function of temperature and reverse bias ($V_{B1}$), so accurately controlling $V_{B1}$ to a relatively small voltage (10's of millivolts) is also an important part of the cancellation scheme described herein. Keeping this $V_{B1}$ voltage controlled and low will help to cancel the dark current contributions of the main and witness photodiodes. The output voltage of the Op-Amp 202 is then given as $$V_{OUT}=V_{B1}+V_{Sig}$$

So, by subtracting the current of the witness photodiode 302 from the current of the main photodiode 304 in this manner, only the precisely known bias voltage is left (or the bias voltage plus only a relatively small residual term that is much smaller than the effects of stray and dark current), and the dynamic range of the optical power measurement based on the signal voltage $V_{Sig}$ can be increased.

Figure 4:
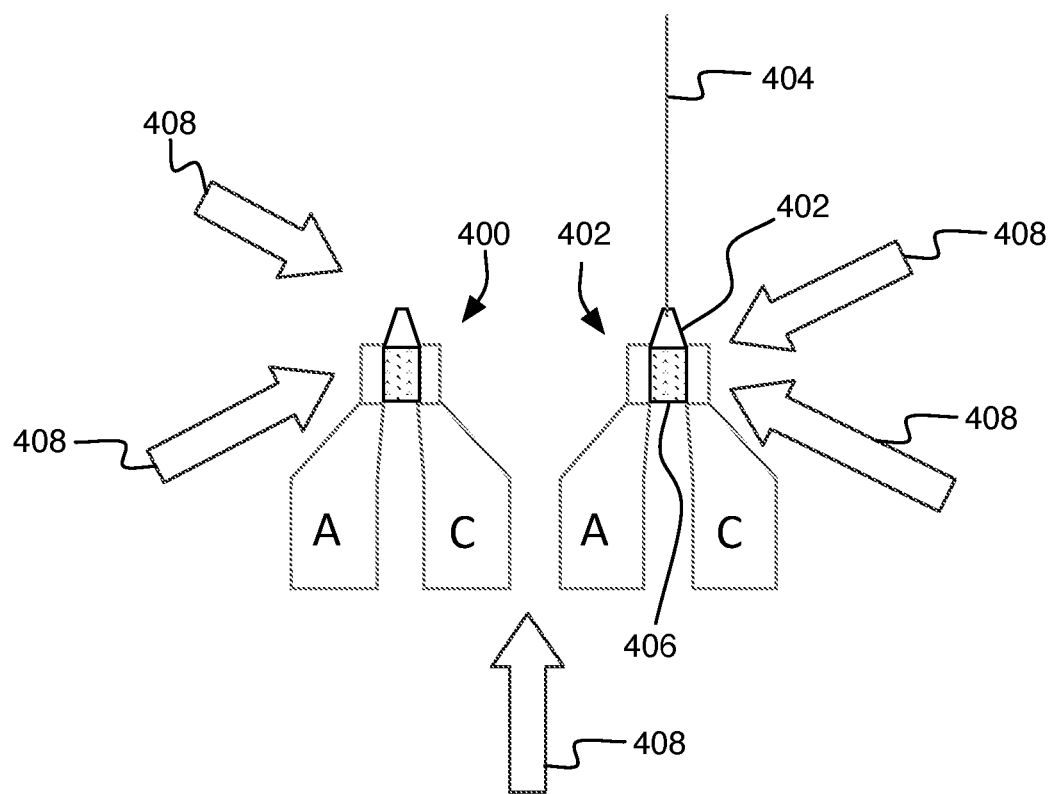
FIG. 4 is a schematic diagram of a main photodiode in proximity to a witness photodiode.

FIG. 4 shows an example of a witness photodiode 400 fabricated in proximity to a main photodiode 402. The main photodiode 402 includes an input coupler 404 that is configured to optically couple a guided mode from a waveguide 404 to an active area 406. Both photodiodes 400 and 402 include an anode contact (labeled "A") and a cathode contact (labeled "C") that are formed from a suitable material (e.g., metal contacts) for electrically connecting to device circuitry, such as a transimpedance amplifier. In this example, the witness photodiode 400 is not coupled to a waveguide but is otherwise essentially identical to the main photodiode 402 including the size of its active area. So, the relative amounts of stray light coming from a variety of directions (as shown in FIG. 4 by the arrows 408 surrounding the photodiodes) will likely be similar in the vicinity of each of the active areas. The witness photodiode 400 also has other similarities in this example, such as the presence of an input coupler and being oriented in the same direction as the main photodiode 402. In other examples, the witness photodiode can have the same size active area but may have certain differences that do not significantly affect the dark current and/or stray current. For example, the input coupler can be left off, or the input coupler can be present and connected to a portion of a waveguide that is broken and/or left uncoupled to the optical distribution network. If there is a portion of a waveguide that is connected to the input coupler of the witness photodiode, the type of material used and the dimensions of the waveguide can be selected to match those of the main photodiode, and/or the waveguides can be oriented in the same direction. In alternative examples, the contacts can be rearranged, which may facilitate placement of the active area of the witness photodiode 400 closer to the active area of the main photodiode 402.

There may be local variations in the amount of stray light in a particular portion of a PIC, which may be due in part to speckle or other patterns caused by constructive and destructive interference, for example. In order to average out these potential local variations, it is possible to place more than one witness photodiode surrounding a particular main photodiode. In the case of multiple witness photodiodes, each active area is scaled in size in inverse proportion to the total number of witness photodiodes surrounding a particular main photodiode. So, the sum of the dark current and the total current due to stray light over all of the witness photodiodes would be substantially equal to the corresponding dark current and stray light current in the main photodiode.

Figure 5:
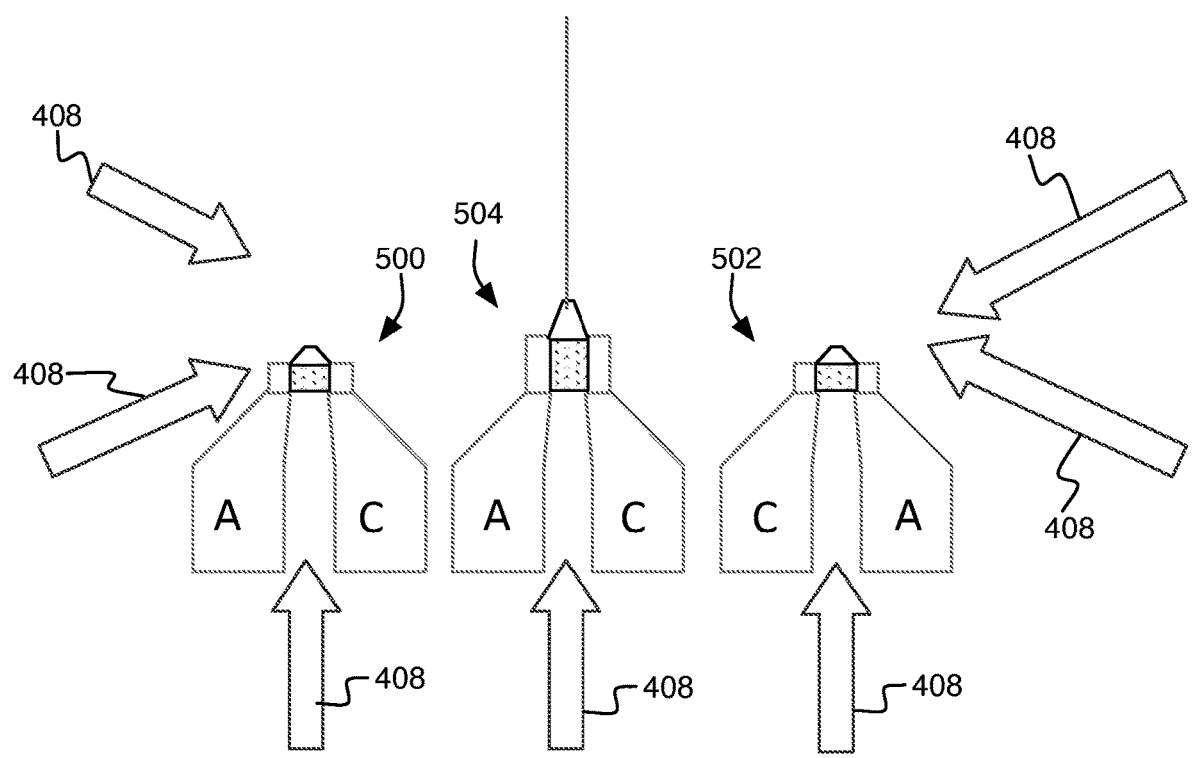
FIG. 5 is a schematic diagram of a main photodiode in proximity to witness photodiodes.
Figure 6:
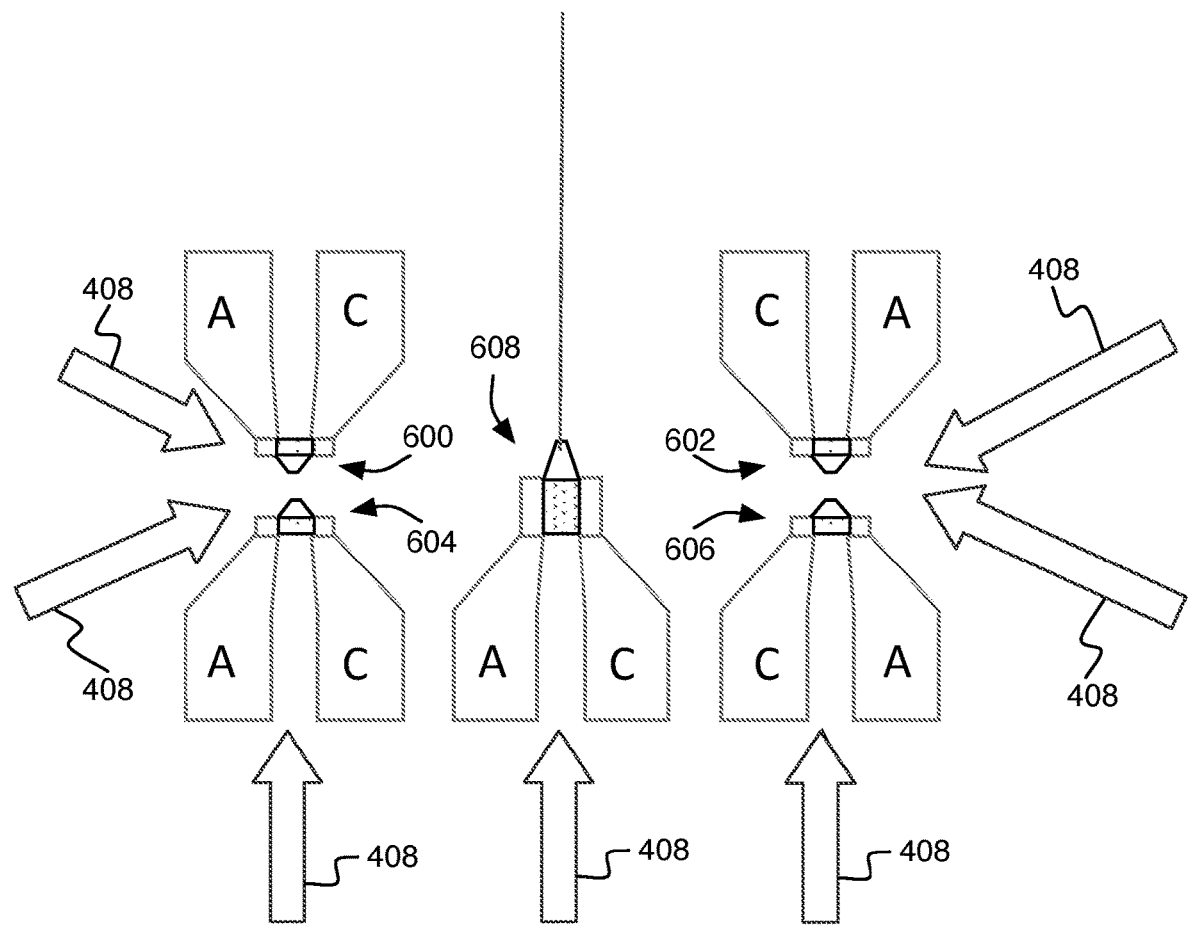
FIG. 6 is a schematic diagram of a main photodiode in proximity to witness photodiodes.

FIG. 5 shows an example in which there are two witness photodiodes 500 and 502 on either side of a main photodiode 504 integrated within the same PIC. Since there are two witness photodiodes in this example, the active areas are half the size of the active area of the main photodiode. Similarly, FIG. 6 shows an example in which there are four witness photodiodes 600 602, 604, and 606 symmetrically arranged around the main photodiode 608 integrated within the same PIC. Since there are four witness photodiodes in this example, the active areas are a quarter the size of the active area of the main photodiode. Generally, an active area of a single witness photodiode or a sum of active areas of multiple witness photodiodes should be selected to be substantially equal to the active area of the main photodiode. Also, none of the witness photodiodes are coupled to the optical distribution network that provides light to the main photodiode, which may be accomplished by leaving each of the witness photodiodes without an input waveguide.

While the examples shown in FIGS. 4-6 have the active areas of each of the witness photodiodes being the same size as each other, in other examples, the active areas can be different from each other. For example, it may be useful to scale the size of the active areas to be approximately proportional to a certain characteristic (e.g., distance from the main photodiode) to weight the different contributions differently in a weighted average of the stray light surrounding the main photodiode. In some arrangements, along with witness photodiodes, other structures can be included (e.g., structures composed of the same material as the photodiodes, such as Germanium) to increase the uniformity of the environment surrounding a main photodiode.

The closer the witness photodiodes are to the main photodiode, the more closely matched the stray light that is detected may be, but different fabrication systems may have different challenges for achieving dense placement of two or more photodiodes. For example, there may be design rules that limit spacing between adjacent structures made from particular materials (such as Germanium from which the active areas of the photodiodes are composed, or the metal from which the contacts are composed). In some cases, factors such as detector size or wavelength of light can affect achievable separation distances. Separation distances that can be achieved for some fabrication systems are as small as around 5 microns between edges of neighboring photodetectors that have active areas of around 100 to 200 square microns. Larger separation distances can still provide significant improvements from the techniques described herein. For example, relative to the size of the active areas of the photodiodes, separation distances of around 2 or 4 times a reference figure of merit, such as the square root of the active area or maximum diameter of the active area (e.g., for an active area having a given shape, the maximum diameter is the length of the largest line segment with endpoints on the perimeter of that shape), still yield notable improvement. A separation distance less than about 10 times such a figure of merit may be used in some implementations.

Figure 7:
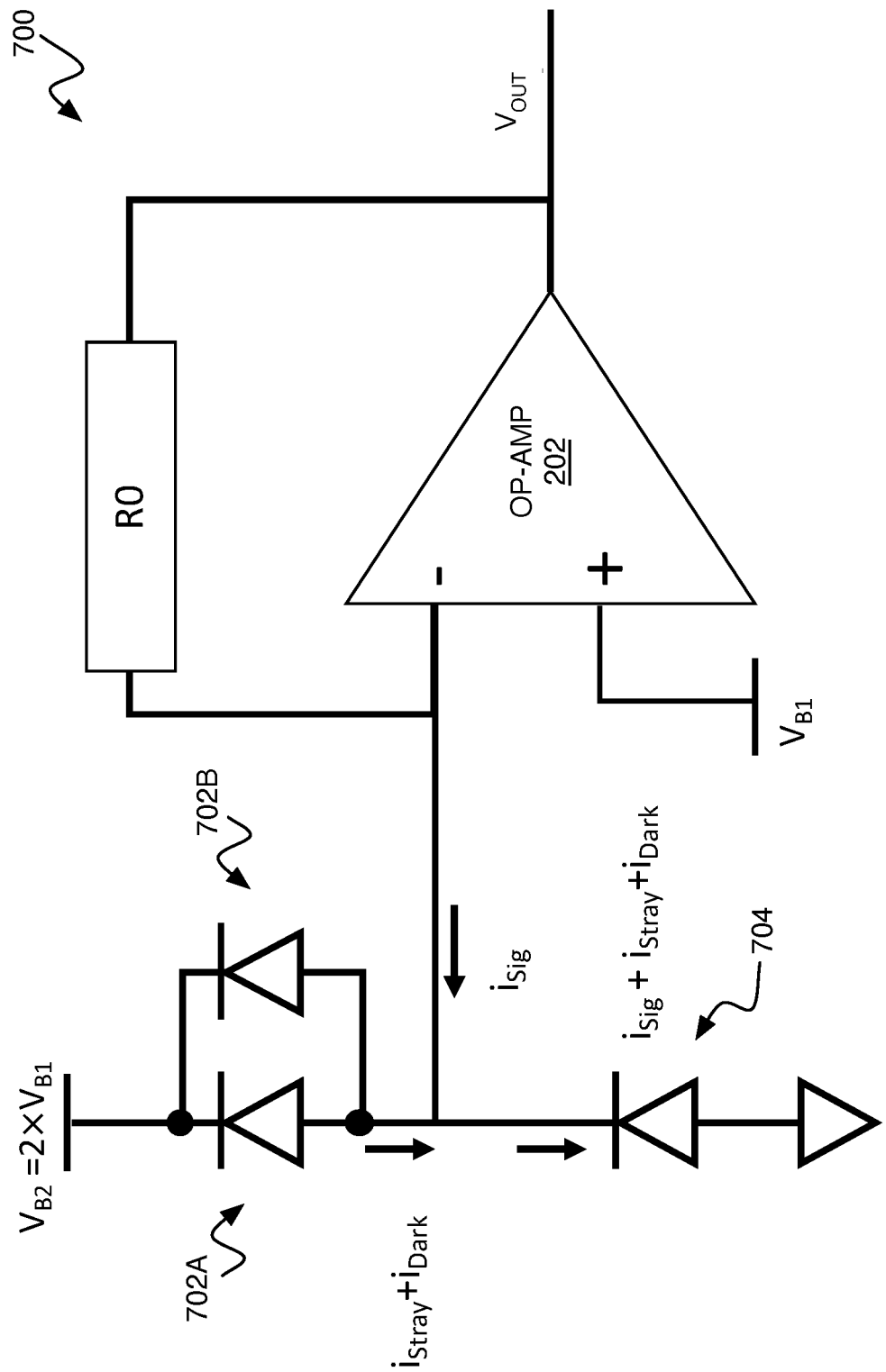
FIG. 7 is a circuit diagram of an example transimpedance amplifier.

Combining measurements from multiple witness photodiodes has the effect of averaging of the stray light distribution around the main photodiode, according to the placement of the witness photodiodes. Circuits can be used to perform the averaging and subtraction using any of a variety of techniques. Referring to FIG. 7, in one example TIA circuit 700, there are two witness photodiodes 702A and 702B connected in parallel enabling the sum of their generated currents to be generated before that sum is subtracted the current from the main photodiode 704. So, as in the example of FIG. 3, the output voltage of the Op-Amp 202 is then given as $V_{OUT}=V_{B1}+V_{Sig}$. In this example, to ensure that the dark currents are equalized, there is an additional bias voltage $V_{B2}=2*V_{B1}$ connected to the anodes of the witness photodiodes 702A and 702B. This sets the reverse bias voltage across each witness photodiode ($V_{B2}-V_{B1}=V_{B1}$) to be the same as the reverse bias voltage ($V_{B1}$) across the main photodiode 704. Other aspects of the TIA circuit 700 are similar to aspects of the TIA circuit 300.

Figure 8:
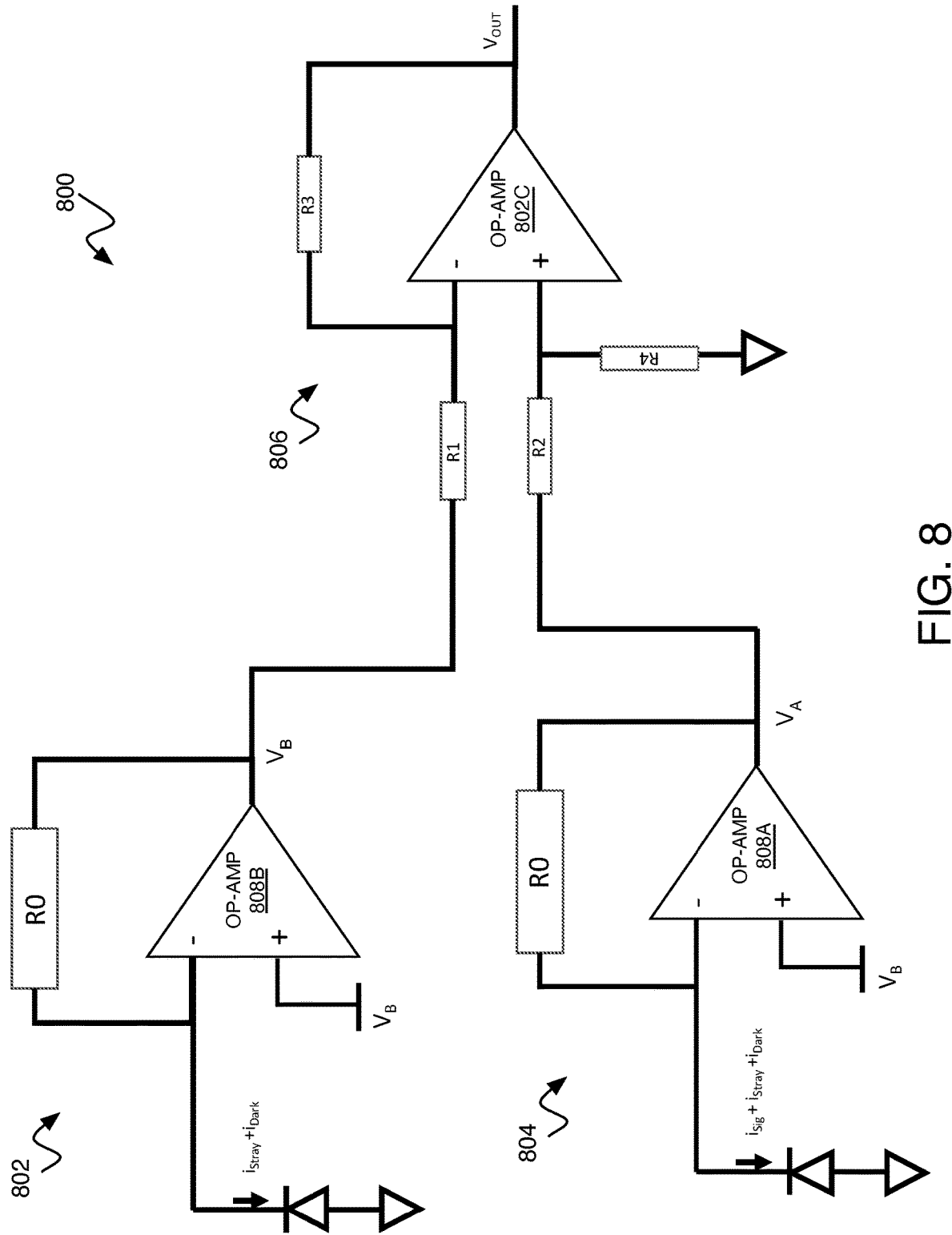
FIG. 8 is a circuit diagram of an example voltage subtraction circuit.

There are a variety of techniques for subtracting the witness-photodiode current(s) (or other signal(s) derived from the witness-photodiode current(s)) from the main-photodiode current (or signal derived from the main-photodiode current). Referring to FIG. 8, an example voltage subtraction circuit 800 uses separate TIAs to enable the subtraction of the dark current and stray light effects measured by a witness photodiode from a total output of a main photodiode as voltages instead of currents. In this example, a witness photodiode is part of a first TIA circuit 802, and a main photodiode is part of a second TIA circuit 804. A difference amplifier 806 is then configured to perform subtraction between an output voltage $V_A$ of an Op-Amp 808A in the TIA circuit 804 and an output voltage $V_B$ of an Op-Amp 808B in the TIA circuit 802. This subtraction of voltages achieves an equivalent subtraction of the effects of the dark current and stray light, but in the voltage domain instead of the current domain. With values of resistors connected to the terminals of the Op-Amp 808C of the difference amplifier 806 set as $R_1=R_2$ and $R_3=R_4$, the output voltage of the Op-Amp 808C is $$V_{OUT} = \frac{R_3}{R_1}(V_A - V_B) = \frac{R_3}{R_1}V_{Sig}$$

Figure 9:
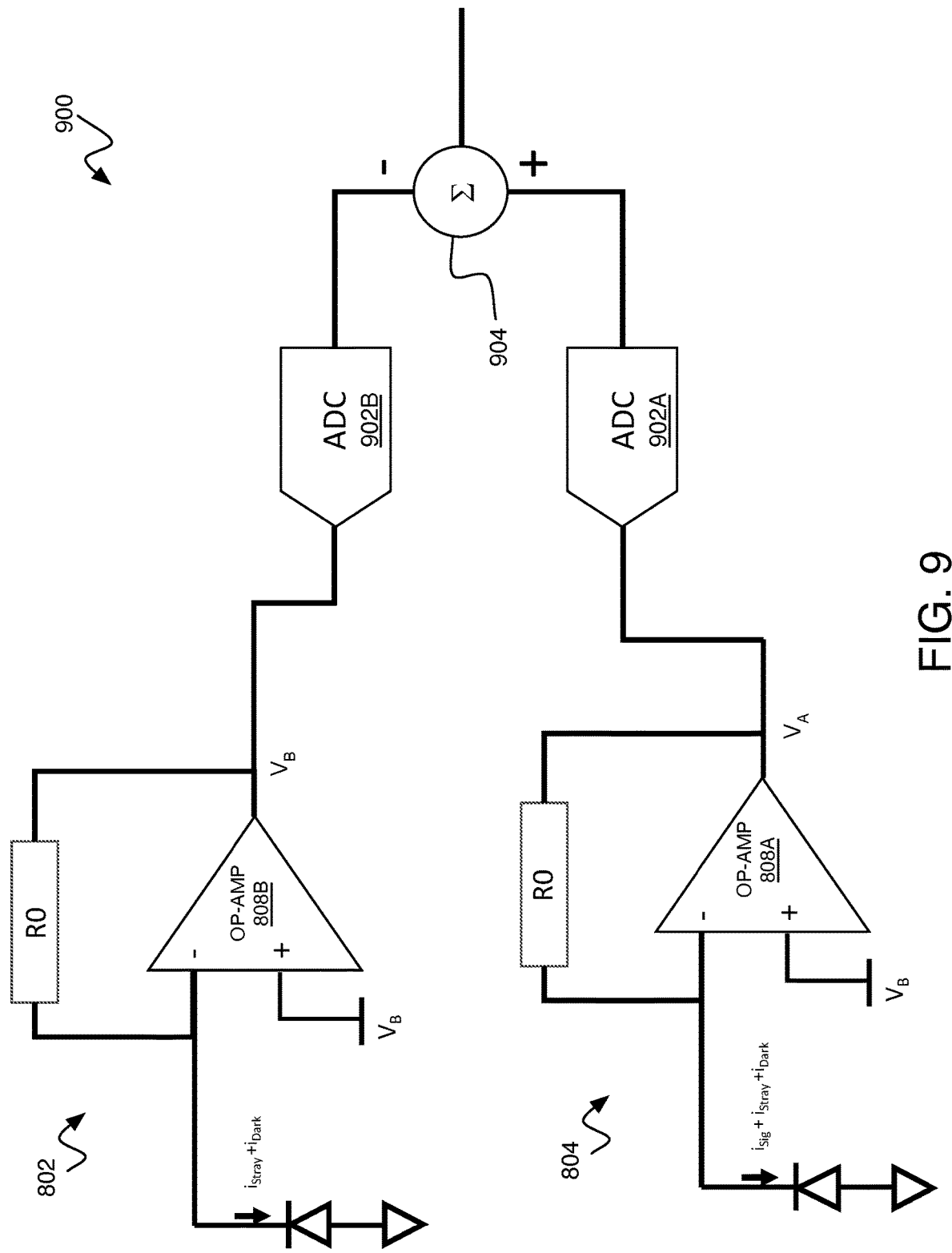
FIG. 9 is a circuit diagram of an example digital subtraction circuit.

Alternatively referring to FIG. 9, an example digital subtraction circuit 900 uses a similar configuration as the subtraction circuit 800, except with an analog-to-digital converter (ADC) 902A and ADC 902B for converting the analog voltages $V_A$ and $V_B$, respectively, into digital signals. Once the signals are in the digital domain, the subtraction can be performed by a digital subtraction module 904 including appropriate digital circuitry (e.g., an application specific integrated circuit (ASIC), processor, or other circuitry) that is integrated within or connected to the PIC (e.g., via metal contact(s) in the PIC).

A variety of other circuit configurations can be used to perform the subtraction between witness photodiode(s) and the main photodiode, and/or the addition of outputs of different witness photodiodes. For example, instead of standard inverting transimpedance amplifiers, other kinds of amplifier configurations can be used, or various combinations of the different types of circuits described herein can be used, where some witness photodiodes are added in the current domain and subtraction is performed in voltage domain, or witness photodiodes are added in the voltage domain and subtraction is performed in the voltage domain. Also, the contributions of different witness photodiodes can be weighted differently based on the sizes of their active areas, as mentioned above, and/or based on parameters of the circuit performing the addition and subtraction (e.g., values of resistors, and/or digital multiplicative factors). The weights can be selected based on predetermined design factors and/or empirically determined calibration measurements.

In some implementations, even if the witness PDs are used to subtract the effects of stray light, it can also be useful to reduce the amount of stray light propagating in one or more of the different layers of a PIC. In such implementations, structures can be incorporated into the PIC to absorb at least a portion of the stray light. Such light absorbing structures are able to reduce the intensity of any remaining stray light that may reach the main photodiodes (also called sensing photodiodes). In some implementations, techniques and materials that are compatible for use in CMOS fabrication facilities can be configured for forming light absorbing structures in a PIC device such as a SiP die (or in an integrated PIC/IC device). For example, some of the materials that can be used to generate light absorbing structures in the layers of a PIC fabricated using a CMOS process are as follows: doped silicon, germanium, and metals, as described in more detail below.

Structures formed from doped silicon can be effective at absorbing stray light. Doping a material such as silicon can be accomplished as part of a standard CMOS fabrication process by introducing atoms of a foreign material (also called "impurities"), which can be of two different types: an n-type dopant (which provides free electrons as negative charge carriers), or a p-type dopant (which provides mobile holes as positive charge carriers). Examples of p-type dopants include boron, gallium, or aluminum. Examples of n-type dopants include arsenic, phosphorous, or antimony. A silicon layer that is to be doped (as part of the CMOS fabrication process) can be, for example, an initial silicon layer that is also used to form waveguides and other photonic structures, or another silicon layer that is grown during the CMOS fabrication process. Whatever silicon layer(s) are used for doping, it is useful if the silicon is as highly doped as possible to render it as absorbing as practically possible. The concentration of a dopant can be characterized by different degrees of concentration, which can be associated with corresponding symbols (P for p-type, and N for n-type) within various quantitative ranges. A "P" or "N" designation of concentration is a moderate degree of doping (e.g., a concentration of less than $10^{18}$ atoms per cubic centimeter). A "P$^+$" or "N$^+$" designation of concentration is a heavy degree of doping (e.g., a concentration of between about $10^{18}$ to $10^{20}$ atoms per cubic centimeter). A "P$^{++}$" or "N$^{++}$" designation of concentration is an even heavier degree of doping (e.g., a concentration of greater than about $10^{20}$ atoms per cubic centimeter). A P$^{++}$ or N$^{++}$ concentration is effective for the absorbing structures in a silicon layer, whereas undoped silicon has relatively little absorption (which is why it is typically used to form optical waveguides).

Germanium can be grown onto portions of a wafer using an epitaxy process. The germanium can be grown in thicknesses from 100 nm to a few microns. In some implementations, a germanium structure is grown on top of a silicon structure. For example, the silicon structure can be in the form of a tile (e.g., a square tile) that has been etched within a silicon layer, and the germanium can be in the form of a smaller tile positioned on top of the silicon tile. Germanium is an effective absorbing material, and thus may be able to absorb a significant portion of the stray light. The silicon underneath the germanium can be doped to any degree or can remain undoped. There may be rules associated with the CMOS fabrication process that limit the quantity of germanium that can be grown (e.g., due to the stress caused by the lattice mismatch) and/or the proximity of the germanium to other photonic structures, including photodiodes, also formed using germanium. The germanium can be grown on silicon with various amounts of doping, from undoped to very highly doped.

Metal can also be used as an absorber. An electromagnetic wave having a wavelength in the visible or infra-red part of the spectrum propagates into metals with a very high attenuation. This is characterized by the high imaginary part of the refractive index of metals. Metal deposited on top of silicon can thus act as an absorber. Although a larger fraction of an incident optical wave is reflected according to the Fresnel equation, a small fraction is transmitted and absorbed inside the metal.

The silicon layer used for the waveguide layer (e.g., the silicon layer above the BOX layer of a SOI wafer) is typically about 220 nm to about 500 nm thick. Doping this relatively small thickness of a silicon layer may not absorb stray light as effectively as germanium, however, but the stray light will pass through the light absorbing structures in the silicon layer multiple times, so the amount of absorption can still be effective for mitigating the effects of stray light on photonic device characteristics such as dynamic range. Alternatively, a potentially thicker silicon layer, deposited by subsequent CMOS process steps, can be used to form the doped silicon light absorbing structures. The thicker the silicon, and the more it is doped, the higher the absorption will be.

Referring to FIG. 10, a portion of a photonic circuit shows an arrangement of light absorbing structures in the general vicinity of a waveguide 1004 and a photodetector 1006. Some CMOS fabrication rules may require certain tiling patterns be used for various purposes. The rules may specify density of tiles, dimensions and shapes of tiles, or various other characteristics, for example, for certain other mechanical or fabrication process purposes for which the tiling is used. The tiling patterns may fill otherwise unused area in a PIC, such as area around the waveguide 1004, as shown in FIG. 10. In this example, the tiles have a square shape and even spacing, but in other examples any polygons that are able to be arranged into a tiled pattern may be used, and the tiling pattern may have different spacing between adjacent tiles in different dimensions. The gaps 1008 between the tiles may be filled with a material (e.g., silicon dioxide) used for a layer deposited or grown on top of a silicon layer from which the tiles are formed.

However the tiles are arranged geometrically, such tiling structures can be used to fabricate light absorbing structures, for example, by doping the silicon tiles and/or by adding germanium to the tiles. In this example, some light absorbing structures are formed from a doped silicon tile 1000 without any germanium in contact with the doped silicon, and some light absorbing structures are formed from a silicon tile 1000 with a germanium tile 1002 grown on a portion of the surface of the silicon tile 1000, where the doping of that tile could vary from undoped to very highly doped. In this example, the light absorbing structures closest to the photodetector 1006 use just the doped silicon tile 1000 without germanium due to a fabrication design rule that limits how close germanium tiling can be to photonic structures that contain germanium, such as the photodetector 1006. Even in a case such as this, while respecting the minimum allowed spacing from the photodetector 1006, the light absorbing structures can use both the doped silicon tile 1000 and the germanium tile 1002 (or the germanium tile 1002 without the doped silicon tile 1000).

In some cases, changes to the tiling pattern can be made while staying within the fabrication rules (or by modest changes to the fabrication rules) to optimize size and/or placement of the light absorbing structures. For example, larger tiles can be used to cover a larger percentage of a large otherwise unused area, or smaller tiles can be used to more closely conform to the edges of an area that has a higher density of device photonic structures.

The following experimental results provide quantitative estimates of the effects of the light absorbing structures on the performance of certain photonic devices, by way of example only. A variety of performance results may be obtained for different levels of doping, different arrangement of tiles or other shapes and/or arrangements of light absorbing structures. These estimates are based on results from prototype SiP dies on which the optical front end of a coherent receiver has been fabricated.

A first prototype SiP die included germanium tiles without doped silicon, to assess the effects of the germanium. With 8% tiling density (averaged over the entire surface of the SiP die), the improvement in dynamic range was about 1.5 dB. In some experiments, the improvement in dynamic range was approximately directly proportional to the tiling density. The tiling density can be increased to significantly higher than 8% in some cases, depending on the density of photonic structures. For example, in a relatively standard device configuration, the germanium density can be increased to about 25% to 30%, which would provide about a 5 dB to 7 dB increase in dynamic range. A second prototype SiP die included P++ doped silicon tiles without germanium. With 20% tiling density, the improvement in dynamic range was about 1.0 dB. In a relatively standard device configuration, the doped silicon tiling density can be increased to about 30% to 40%, which would provide a 1.5 dB to 2.0 dB increase in dynamic range. The doped silicon tiling alone without germanium is not as effective as structures that include germanium in absorbing (and thus reducing) the stray light, but the doped silicon tiling could be used in SiP/CMOS process flow in which germanium is not available. Alternatively, doped silicon tiling could be used in combination with germanium tiling, as described above, and it is expected that the benefits of each type of tiling add to increase the total absorption and thus and improve the overall dynamic range.

The absorbing of stray light using light absorbing structures as described herein can be combined with various other techniques for absorbing stray light and/or mitigating the effects of remaining stray light. For example, in some implementations, the top surface of a SiP die can be covered with a light absorbing adhesive (e.g., epoxy) that will effectively absorb additional stray light. However, dispensing adhesives on small PIC chips can be relatively complex due to the need to cover the maximal surface, while avoiding any wirebonds, optical bonding surfaces, and RF lines, as any adhesive on these surfaces or structures can affect reliability, performance, and processing. The adhesive dispensing process may also be difficult to control, and thus could have a notable impact on yield. The additional step of applying the adhesive would also add cost to the product because of the extra dispensing equipment capital expense and the time to perform the dispensing operations, as well the addition of the adhesive curing operation. For implementations that do not apply such an adhesive, standard steps in a CMOS fabrication process can be used, as described herein, for potentially an insignificant cost or yield impact.

If there is a predictable amount of stray light that will remain, even if some stray light is absorbed, there are some techniques that mitigate the effects of the stray light using calibration tables. For example, with a single photodetector, the effect of stray light and reverse-bias leakage (also called "dark current") can be reduced to an extent using calibration tables to measure the responsivity of the stray light and dark current as a function of wavelength and temperature. These extensive calibration tables come at the real cost of notably increased test time on every manufactured part. So, for implementations that do not use such calibration tables, there may also be significant cost reduction. There may also be difficulty in accurately predicting the quality of the calibration tables as the products age because of the complex nature of the optical interference signal.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
   one or more semiconductor layers;
   an optical distribution network comprising a plurality of waveguides configured to deliver light to a plurality of tap locations, the plurality of waveguides including at least a first waveguide integrated within at least one of the one or more semiconductor layers;
   a first photodiode integrated within at least a first layer of the one or more semiconductor layers, the first photodiode comprising
      an active area optically coupled to a guided mode of the first waveguide to optically couple the first photodiode to the optical distribution network, and
      contacts that provide access to the photocurrent from light absorbed in the active area;
   one or more associated photodiodes associated with the first photodiode integrated within at least the first layer in proximity to the first photodiode, where
      an active area of a single associated photodiode or a sum of active areas of a plurality of associated photodiodes is substantially equal to the active area of the first photodiode, and
      none of the one or more associated photodiodes is optically coupled to the optical distribution network; and
   electrical circuitry configured to generate a signal that represents a difference between (1) a signal derived from the first photodiode and (2) a signal derived from a single associated photodiode or a sum of signals derived from a plurality of associated photodiodes.

2. The apparatus of claim 1, wherein the associated photodiodes associated with the first photodiode each have at least a portion of an active area that is within a maximum distance from at least a portion of the active area of the first photodiode, and the maximum distance is less than 10 times a maximum diameter of the active area of the first photodiode.

3. The apparatus of claim 2, wherein the maximum distance is less than the square root of the active area of the first photodiode.

4. The apparatus of claim 2, wherein the maximum distance is less than 10 microns.

5. The apparatus of claim 1, wherein the electrical circuitry comprises circuitry that is connected to a metal contact within an integrated circuit that includes the one or more semiconductor layers.

6. The apparatus of claim 1, wherein the electrical circuitry comprises a node between a first wire connected to a cathode of the first photodiode, a second wire connected to an anode of at least one of the one or more associated photodiodes, and a third wire.

7. The apparatus of claim 6, wherein the electrical circuitry comprises an operational amplifier configured as a transimpedance amplifier with the third wire connected to an inverting input of the operational amplifier.

8. The apparatus of claim 1, wherein the electrical circuitry comprises a first transimpedance amplifier including the first photodiode, a second transimpedance amplifier including at least one of the one or more associated photodiodes, and circuitry configured to provide an output that is proportional to a difference between (1) an output voltage of the first transimpedance amplifier and (2) a quantity that depends on an output voltage of the second transimpedance amplifier.

9. The apparatus of claim 1, wherein the one or more associated photodiodes comprise a plurality of associated photodiodes.

10. The apparatus of claim 9, wherein each of the plurality of associated photodiodes are substantially the same distance from the first photodiode.

11. The apparatus of claim 10, wherein the plurality of associated photodiodes are located at positions that are arranged substantially symmetrically around the first photodiode.

12. A method for fabricating a photonic device, the method comprising:
fabricating one or more semiconductor layers;
fabricating an optical distribution network comprising a plurality of waveguides configured to deliver light to a plurality of tap locations, the plurality of waveguides including at least a first waveguide integrated within at least one of the one or more semiconductor layers;
fabricating a first photodiode integrated within at least a first layer of the one or more semiconductor layers, the first photodiode comprising
an active area optically coupled to a guided mode of the first waveguide to optically couple the first photodiode to the optical distribution network, and
contacts that provide a photocurrent from light absorbed in the active area;
fabricating one or more associated photodiodes associated with the first photodiode integrated within at least the first layer in proximity to the first photodiode, where
an active area of a single associated photodiode or a sum of active areas of a plurality of associated photodiodes is substantially equal to the active area of the first photodiode, and
none of the one or more associated photodiodes is optically coupled to the optical distribution network; and
fabricating electrical circuitry configured to generate a signal that represents a difference between (1) a signal derived from the first photodiode and (2) a signal derived from a single associated photodiode or a sum of signals derived from a plurality of associated photodiodes.

13. The method of claim 12, wherein the associated photodiodes associated with the first photodiode each have at least a portion of an active area that is within a maximum distance from at least a portion of the active area of the first photodiode, and the maximum distance is less than 10 times a maximum diameter of the active area of the first photodiode.

14. The method of claim 13, wherein the maximum distance is less than the square root of the active area of the first photodiode.

15. The method of claim 13, wherein the maximum distance is less than 10 microns.

16. The method of claim 12, wherein the electrical circuitry comprises a node between a first wire connected to a cathode of the first photodiode, a second wire connected to an anode of at least one of the one or more associated photodiodes, and a third wire.

17. The method of claim 12, wherein the electrical circuitry comprises a first transimpedance amplifier including the first photodiode, a second transimpedance amplifier including at least one of the one or more associated photodiodes, and circuitry configured to provide an output that is proportional to a difference between (1) an output voltage of the first transimpedance amplifier and (2) a quantity that depends on an output voltage of the second transimpedance amplifier.

18. The method of claim 12, wherein the one or more associated photodiodes comprise a plurality of associated photodiodes.

19. The method of claim 18, wherein each of the plurality of associated photodiodes are substantially the same distance from the first photodiode.

20. The method of claim 19, wherein the plurality of associated photodiodes are located at positions that are arranged substantially symmetrically around the first photodiode.

* * * * *